UNITED STATES PATENT OFFICE.

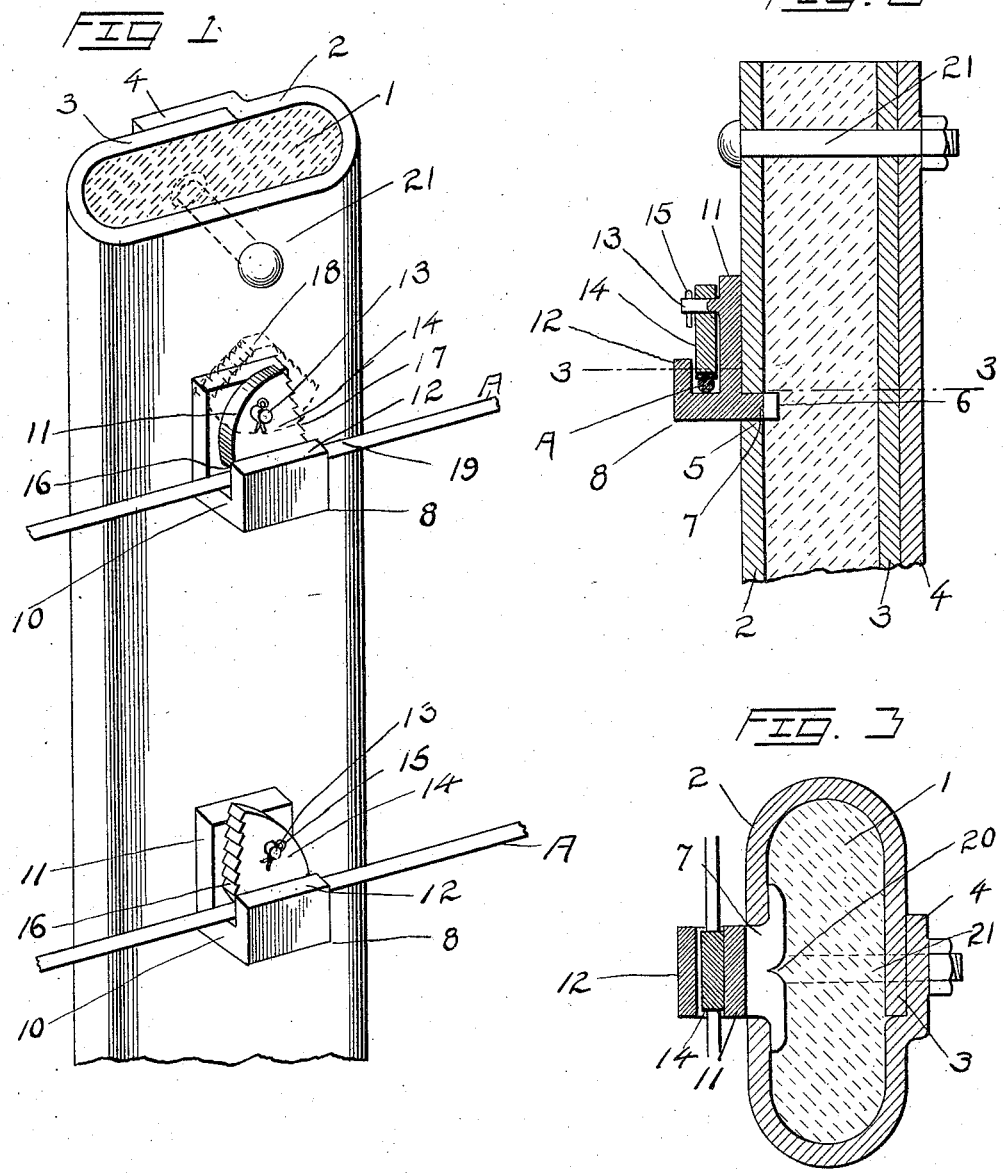

GEORGE H. MEYER, OF ST. EDWARD, NEBRASKA.

COMBINED FENCE-POST AND WIRE-CLAMP.

1,066,299.           Specification of Letters Patent.      Patented July 1, 1913.

Application filed June 8, 1912. Serial No. 702,499.

*To all whom it may concern:*

Be it known that I, GEORGE H. MEYER, a citizen of the United States, residing at St. Edward, in the county of Boone and State of Nebraska, have invented new and useful Improvements in Combined Fence-Posts and Wire-Clamps, of which the following is a specification.

This invention relates to combined fence posts and wire clamps and has for an object to provide a device of this character which will embody a hollow sheet metal member, an inner reinforcing member extending the full length thereof and a wire clamp which is so associated with the element and with the member as to positively hold them operatively associated or connected with each other.

Another object of the invention is to provide a post in which the wire clamping portion thereof will effectually operate to hold the wire against movement in either direction longitudinally of the fence structure.

In the drawing forming a portion of this application, and in which like letters of reference indicate similar parts in the several views:—Figure 1 is a perspective view of the post. Fig. 2 is a section through the wire clamp and through a portion of the post. Fig. 3 is a section on line 3—3 of Fig. 2.

The post comprises an inner reinforcing member 1 and an outer casing 2, the latter being disposed in embracing relation upon the former and being provided with interfitting terminals 3 and 4.

The casing is provided with a vertical series of horizontally disposed rectangular passages 5 which are located in line with similar passages 6 in the reinforcing member 1. These alining passages receive the correspondingly formed rectangular shanks 7 upon wire clamping members 8. The members 8 are designed to receive the longitudinal wires A of a fence structure, the said members each being provided with a base portion 10 and inner and outer flanges 11 and 12, the latter being relatively short as compared with the flange 11 for a purpose to be hereinafter described. The flanges 11 and 12 are spaced relatively for the reception of the line wire therebetween, and as illustrated each device is provided on its flange 11 with a horizontal stem 13 for revolubly supporting a gripping element 14. A cotter pin or like retainer 15 is passed through the outer extremity of the stem 13 so as to hold the gripping element against accidental displacement therefrom. The gripping element is provided with oppositely inclined surfaces 16 and 17 which each have formed thereon clamping teeth for engagement with the line wire, it of course being understood that the element 14 is designed for adjustment whereby the surfaces 16 and 17 may be singly brought into engagement with the line wire. The gripping teeth upon the surface 16 of the clamping element and the similar teeth of the surface 17 extend in a common direction and preferably toward the reduced end 18 of the clamping element whereby on the proper adjustment of the element the teeth upon one of the wire gripping surfaces thereof can be made to hold the wire against longitudinal creeping in one direction while the teeth on the companion surface of the gripping element can be made to engage against the wire to hold the latter against longitudinal creeping in an opposite direction.

It is stated that the flange 12 is relatively short as compared with the flange 11 and in view thereof the clamping element 14 can be adjusted to assume the dotted line position shown in Fig. 1 whereby the arcuate surface 19 of the element is disposed above the plane of the upper edge of the flange 12 to permit of the passage of the wire into the channel defined by the base 10, and the flanges 11 and 12. Any number of the clamps 8 can be employed as may depend upon the number of longitudinal wires of the fence fabric. By providing the portion 7 of the clamps of rectangular configuration and through fitting such portions in correspondingly formed openings in the post the clamps may be effectually applied to the latter and held against rotation thereon. The portions 7 are preferably provided with conical sockets 20 whose walls may be upset against one side of the post as clearly shown in Fig. 3 of the drawing. Should it be desired, fastenings 21 may also be extended through the reinforcing member 1 and through the casing 2 to assist in the action of the portion 7 in holding said members properly connected together.

I claim:—

A wire fastening for fence posts comprising in combination with a post having a horizontal aperture therein, of a member mounted exteriorly of the post and provided with a vertical flange lying in mutual contact with an adjacent wall of the post, a base portion extending horizontally from the flange and a relatively short flange carried by the base portion and spaced thereby from the first flange and forming a wire guard to prevent the lateral displacement of the wire, a clamping member movably mounted on the first flange and having a gripping surface adapted to coöperate with the base flange whereby to hold the wire against longitudinal creeping on said base flange and an integral portion of said base portion extending through the aperture of the post and split in its main length and upset against the inner walls of the post, said integral portion being of rectangular configuration whereby to hold the fastening device against rocking movements on the post.

In testimony whereof I affix my signature in presence of two witnesses.

GEORGE H. MEYER.

Witnesses:
 CHAS. JUSTUS,
 JAMES G. PICKING.

Copies of this patent may be obtained for five cents each, by addressing the "Commissioner of Patents, Washington, D. C."